United States Patent [19]
Carlson

[11] 3,717,701
[45] Feb. 20, 1973

[54] PROCESS FOR SEQUESTERING METAL IONS BY USE OF AN AMINO CARBOXYLIC PHOSPHINE

[75] Inventor: Ronald H. Carlson, Lewiston, N.Y.
[73] Assignee: Hooker Chemical Corporation, Niagara Falls, N.Y.
[22] Filed: Dec. 9, 1970
[21] Appl. No.: 96,610

Related U.S. Application Data

[63] Continuation-in-part of Ser. No. 680,040, Nov. 2, 1967, Pat. No. 3,578,708.

[52] U.S. Cl............423/272, 260/534 E, 260/534 M, 260/606.5 P
[51] Int. Cl............C01b 15/02, C07c 101/00, C07d 105/02
[58] Field of Search......23/207.5; 260/534 E, 534 M, 260/606.5 P

[56] References Cited

UNITED STATES PATENTS 3,053,634   9/1962   Luten, Jr. et al....................23/207.5

FOREIGN PATENTS OR APPLICATIONS 971,955   4/1959   Germany...........................260/534 E Primary Examiner—Oscar R. Vertiz
Assistant Examiner—Hoke S. Miller
Attorney—Peter F. Casella, Donald C. Studley, Richard P. Mueller, James Mudd and William J. Crossetta

[57] ABSTRACT

By contacting an amino carboxylic phosphine sequestering agent with an aqueous solution containing ions of transition metals, said ions react with the amino carboxylic phosphine to form soluble complexes. Since the decomposition of hydrogen peroxide is catalyzed by the presence of trace metal ions, such as $Cu^{++}$, $MN^{++}$, and $Fe^{+++}$, the addition of these sequestering agents to peroxide solutions serves to deactivate such metal ions and thus reduce their catalytic effect on peroxide composition. Such agents also serve to control hardness of water and to deactivate objectionable metal ions in textile processing and in metal cleaning and finishing.

16 Claims, No Drawings

PROCESS FOR SEQUESTERING METAL IONS BY USE OF AN AMINO CARBOXYLIC PHOSPHINE

CROSS REFERENCE TO RELATED APPLICATIONS

This case is a continuation-in-part of Ser. No. 680,040, filed Nov. 2, 1967, now U.S. Pat. No. 3,578,708.

BACKGROUND

The use of complexing agents which combine with metal ions in solution to form soluble complexes (which agents are commonly referred to as sequestrants) is of great importance in many industrial processes inasmuch as it may prevent undesired precipitation reactions from occurring. For example, sequestration of calcium is important in water treatment and in laundry solutions for controlling hardness of the water. Sequestration of the heavy metals such as copper and nickel is essential in such areas as textile processing and metal cleaning and finishing. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

The decomposition of aqueous hydrogen peroxide solutions is catalyzed by dissolved trace metal ions (notably $Cu^{+2}$, $Fe^{+3}$, and $Mn^{+2}$) present in solution. The addition of metal sequestrating agents to peroxide solutions serves to deactivate these dissolved trace metals and thus reduce their catalytic effect upon peroxide decomposition.

It is an object of this invention to provide a novel compound or mixtures thereof for sequestering metal ions.

Another object is a sequestrant superior in effectiveness as compared to prior art sequestrants.

Another object is a process of use of novel compound, as a sequestrant.

Another object is another process of use of the novel compound, as a highly effective stabilizer of aqueous hydrogen peroxide solution against metal catalyzed decomposition. This stabilization utility is directly related to the sequestering activity of the compounds.

Other objects become apparent from the above and following disclosure.

SUMMARY OF THE INVENTION

The case is directed to a process for sequestering metal ions of the Periodic Table, such as, Group IIA, Group IIIA, Group IVA, the transition and rare earth metals by adding an amino carboxylic phosphine of a particular structure to an aqueous solution containing the metal ions.

DESCRIPTION OF PREFERRED EMBODIMENTS

In accordance with this invention, a method of sequestering at least one metal ion in an aqueous solution thereof comprises adding a novel compound to the solution, the novel compound being of the formula

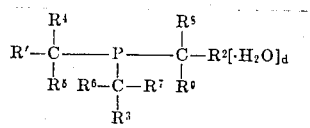

wherein $d$ is from 0 to 3;

$R^1$, $R^2$ and $R^3$ are independently selected from the group consisting of hydroxy and an amino carboxylic group of the formula:

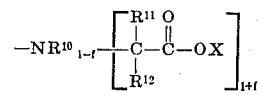

wherein $f$ is 0 or 1;

X is independently selected from the group consisting of hydrogen, ammonium and an alkali metal;

$R^4$–$R^9$ are independently selected from the group consisting of hydrogen, hydroxy and lower alkyl;

$R^{10}$–$R^{12}$ are independently selected from the group consisting of hydrogen and lower alkyl;

provided at least one of said $R^1$, $R^2$ or $R^3$ is said amino carboxylic group.

In a preferred embodiment of this invention, $R^1$, $R^2$, and $R^3$ are each said aminocarboxylic group, and $R^4$ through $R^9$ are each hydrogen.

In a further preferred embodiment, X is sodium or potassium.

The alkyl substituents typically include methyl, ethyl, propyl, butyl, hexyl, and the like.

Further preferred compounds of this invention include:

(a) hexasodium tris(N,N-diacetatoaminomethyl)phosphine [hereafter designated STDAMP]:

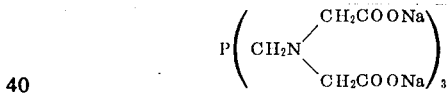

(b) trisodium tris(N-acetatoaminomethyl)phosphine [hereafter designated STAMP]:

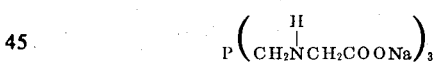

(c) tris(N,N-diacetatoaminomethyl)phosphine [hereafter designated TDAMP]:

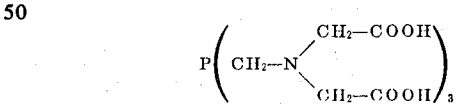

(d) tetrasodium mono(hydroxymethyl)bis(N,N-diacetatoaminomethyl)-phosphine [hereafter designated SHMBAMP]:

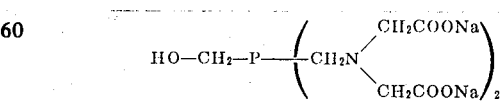

(e) disodium bis(hydroxymethyl)N,N-diacetatoaminomethyl phosphine [hereafter designated SBHMAMP]:

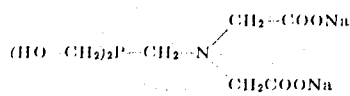

Other illustrative compounds of this invention, in addition to the above preferred compounds, typically include: hexapotassium tris(N,N-diacetato-1-aminoethyl)phosphine; triammonium tris(N-acetatoaminomethyl)phosphine; hexasodium tris(N,N-dipropionato-1-aminoethyl)-phosphine; tripotassium tris (N-acetatoaminomethyl)phosphine; tetrapotassium mono(hydroxymethyl)bis(N,N-diacetatoaminomethyl)phosphine; sodium bis(hydroxymethyl)N-methyl, N-acetatoaminomethyl phosphine, and the like.

The trivalent phosphorus compounds of this invention are in general prepared by reacting a tetrakis(hydroxyalkyl)phosphonium salt (such as tetrakis(hydroxymethyl)phosphonium chloride or bromide) or tris (hydroxyalkyl)phosphine (such as tris(hydroxymethyl)phosphine) with an aminocarboxylic acid of the formula:

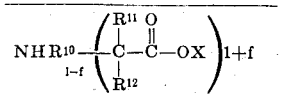

where $R^{10}$, $R^{11}$, $R^{12}$, X and $f$ are each defined above, in the presence of alkali in an amount sufficient to produce a pH at least sufficiently high that said aminocarboxylic acid is substantially completely ionized. Maximum pH is about 12 because pH values above about pH 12 promote oxidation of input tetrakis-(hydroxyalkyl)phosphonium salt or tris(hydroxyalkyl)phosphine to tris(hydroxyalkyl)phosphine oxide. Preferred pH ranges from about pH 10.5 to about pH 11.5. A pH value below about 10 promotes protonation of the amino acid, whereby the reaction of the process of this invention is substantially terminated. A preferred embodiment which produces optimum yield is as follows: an aqueous solution of the tetrakis(hydroxyalkyl)phosphonium salt or tris(hydroxyalkyl) phosphine is added to an alkaline solution of the aminocarboxylic acid, whereby the pH of the solution of the aminocarboxylic acid is maintained in the above-discussed pH range by simultaneous addition of an alkali (caustic) aqueous solution if necessary. The stoichiometry of the reactants and/or the degree to which reaction is carried to completion determines the final product, i.e., determines the degree to which the hydroxy groups are replaced by aminocarboxylic groups.

The trivalent compounds of this invention may be employed alone as a sequestrant, or may alternatively be employed in a mixture with each other. Typical reaction mixtures include a composition of STDAMP/SHMBAMP/SBHMAMP/THPO (where THPO is tris-(hydroxymethyl)phosphine oxide) in typical amounts of (a) about 45%/47%/7%/1%, or (b) about 35%/50%*BS*6%/9%, for example. Reaction mixtures of this type may be prepared, for example, by a process such as is illustrated in Example VII below.

Typical prior art commercial sequestrants with which the sequestrant of this invention can be admixed include trisodium nitrilotriacetate [SNTA], tetrasodium ethylenediaminetetraacetate [SEDTA], trisodium hydroxyethylethylenediaminetriacetate [SHEDTA], pentasodium diethylenetriaminepentaacetate [SDTPA], pentasodium nitrilotrimethylenephosphonate [SNTMP], gluconic acid, sodium tripolyphosphate [STPP], and the like.

The compounds and mixtures thereof, of this invention, are substantially insoluble in organic solvents such as ethyl alcohol, chlorinated hydrocarbon, and inert organic solvents such as hexane, for example.

The metals which may be sequestered by the compounds described herein are ions of Periodic Table Group IIA, Group IIIA, Group IVA, transition metals and rare earth metals. See the Periodic Table of the Handbook of Chemistry and Physics, 50th Edition (1969-1970.

Some of the preferred metals whose ions may be sequestered by the compounds of this invention include iron, aluminum, copper, nickel, manganese, chromium, tin, lead, gadolinium, europium, neodymium, and the like.

The above compounds of this invention are suitable additionally for other uses, for example in detergents, in metal cleaning baths, in dye solutions, to stabilize peroxide solutions, and the like, by virtue of the compounds' sequestering activity.

The compounds of this invention normally may be used as sequestrants in solutions wherein the pH ranges from about 1 to about 14. The preferred pH depends upon the particular compound employed as a sequestrant. For iron ($Fe^{+3}$) sequestration, preferred pH ranges from about pH 6 to about pH 10-10.5 (i.e., below pH 11). However, for use to stabilize peroxide solutions, such as hydrogen peroxide, a pH of about 4 to about 12 is preferred.

The compounds of this invention, when added to those solutions in which sequestration is desired, may be added as solids or solutions. If it is desired to add said compounds as solution, the compounds may be dissolved in polar solvents such as water, mixtures of water and lower alkanols of from 1 to 4 carbon atoms wherein up to about 50 percent of said mixtures is comprised of alkanol, and the like. From about 0.001 percent to about 25 percent concentration (by weight) may be used (percent concentration [by weight] =

Weight of sequestrant × 100 )

Weight of sequestrant + weight of solvent [if any] in which sequestrant is dissolved before being added to solution to be sequestered + weight of solution to be sequestered [prior to the time sequestrant is added]

though it is preferred to use from about 0.01 to about 5 percent concentration (by weight), and it is even more preferred to use from about 0.1 to about 3 percent concentration (by weight).

It is preferred to use said compounds as sequestrants in aqueous solutions, such as water solutions; solutions containing mixtures of water and lower alkanols of 1 to about 4 carbon atoms wherein up to about 50 percent of said mixtures is comprised of alkanol; and the like. When said compounds are added to the solutions to be sequestered, the temperatures of said solutions may be from about 0° to about 100° Centigrade, though it is preferred that said temperatures be from about 20° to about 70° Centigrade, and it is even more preferred that said solutions be at ambient temperatures.

The following examples are illustrative of the invention, and are not to be deemed limitative thereof, except to the extent specifically stated and to the extent that the appended claims are limited.

EXAMPLE I

For a 3 percent hydrogen peroxide solution the peroxide stabilizing ability of one of the novel sequestrants, i.e., the STDAMP described above, was evaluated as a function of concentration of the STDAMP in the cation-containing peroxide solution to be sequestered. The tests were carried out at pH 8, at 80°C, using 3 parts per million of $Cu^{+2}$ as the decomposition catalyst to be sequestered. It was found that the varying of the STDAMP concentration has a substantial and significant effect upon the peroxide stability. Peroxide stabilization increases almost exponentially as the concentration of the STDAMP is increased from about 0.025 to 0.10 percent, this range thereby being a preferred range at this approximate pH and at this approximate concentration of copper cations for random concentration of hydrogen peroxide solutions. Above a stabilizer (STDAMP) concentration of about 0.075 percent, the hydrogen peroxide was too stable to experimentally measure its half-life. The STDAMP at about 0.025 percent gave a decomposition half-life of about 100 minutes.

EXAMPLE II

Under the same conditions as described in Example I, SEDTA (described above) was evaluated at 0.10 percent concentration and found to give a decomposition half-life of about 100 minutes.

It is significant to note that the SEDTA required about four times as great a concentration as that of the STDAMP in order to obtain an approximately equivalent degree of stabilization, whereby the relative cost of stabilization is significantly lower by use of STDAMP as compared to the SEDTA.

EXAMPLES III-IX

The preceding novel organophosphorus chelating agents of this invention and mixtures thereof were prepared, and their metal sequestering efficiencies evaluated and compared in Tables I and II to values obtained for commercial sequestrants, such as trisodium nitrilotriacetate (SNTA), tetrasodium ethylenediaminetetraacetate (SEDTA), disodium iminodiacetate (SIDA), trisodium hydroxyethylethylenediaminetriacetate (SHEDTA), pentasodium diethylenetriaminepentaacetate (SDTPA), pentasodium nitrilotrimethylenephosphonate (SNTMP) and gluconic acid.

The following test procedure was used in evaluating sequestering efficiency towards $Cu^{+2}$: 0.05 Molar $CuCl_2$ was titrated dropwise with stirring into 100 grams of solution of a given pH containing 50 milligrams of dissolved sequestrant. Titration was continued, along with simultaneous pH adjustment, until a perceptible permanent haze existed in solution. Sequestering efficiency towards $Fe^{+3}$ was evaluated in the same manner as previously described except that 0.5 Molar $FeCl_3$ was titrated into 50 grams of solution containing 0.5 gram of sequestrant. Sequestering efficiency is calculated in terms of:

Lbs. of Metal Ion Sequestered/100 Lbs. of Sequestrant

Compounds and compositions evaluated include:
(a) Hexasodium Tris(N,N-diacetatoaminomethyl)Phosphine (STDAMP)

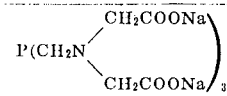

(b) Tris(N,N-diacetoaminomethyl)Phosphine (TDAMP)

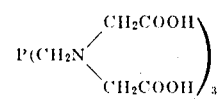

(c) Trisodium Tris(N-acetatoaminomethyl)Phosphine (STAMP)

(d) STDAMP reaction mixture (I)
(e) STDAMP reaction mixture (II)

| Mixture | % Distribution (Compound Designator) |
|---|---|
| (I) | 44.65% (A) |
|  | 46.60% (B) |
|  | 7.72% (C) |
|  | 1.03% (D) |
| (II) | 34.80% (A) |
|  | 49.44% (B) |
|  | 6.53% (C) |
|  | 9.23% (D) |

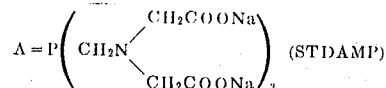

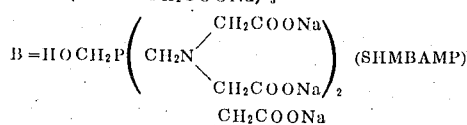

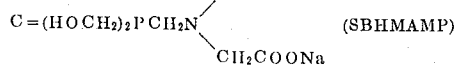

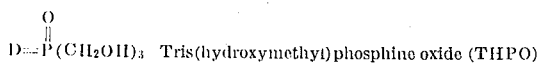

EXAMPLE III

STDAMP was prepared by the reaction of THPC (tetrakis(hydroxy-methyl)phosphonium chloride) with disodium iminodiacetate (SIDA):

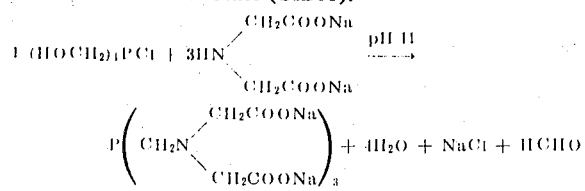

To 447 g of aqueous solution of pH 11 containing 89.6 g (0.459 moles) of dissolved SIDA·H$_2$O was added dropwise with stirring 61 g of aqueous solution containing 29.92 g (0.157 moles) of dissolved THPC. During THPC addition, the pH of the reaction solution was maintained at 11 by the simultaneous addition of 6M NaOH. A temperature elevation of 5°C (25°–30°C) was observed during the course of THPC addition, indicating a slightly exothermic reaction to be occuring. At the end of THPC addition, a yellow solution was present; this solution was stirred for an additional 150 minutes to ensure complete reaction. Solid product was recovered from the reaction solution by the addition of acetone to form a two layer system (an upper organic layer and a lower aqueous, oily layer). The layers were separated by decantation and additional acetone added to the lower layer (followed by successive decantation) until a viscous white mass was present. This material was vacuum dried at 70°C for 65 hours to yield a pale yellow free flowing powder. Yield: 90.0 g (93 percent of theoretical).

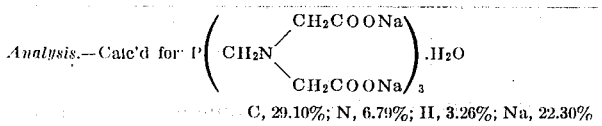

C, 29.10%; N, 6.79%; H, 3.26%; Na, 22.30%

Found : C, 29.12%; N, 6.75%; H, 3.26%; Na, 22.93%.

The formation of STDAMP was further supported by infrared and nuclear magnetic resonance spectroscopic data, along with chemical test data.

EXAMPLE IV

STDAMP was also prepared by the reaction of tris(hydroxymethyl)phosphine (THP) with disodium iminodiacetate (SIDA):

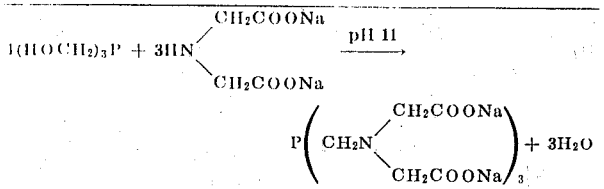

To 3,532 g of aqueous solution of pH 12 containing 706.4 g (3.62 moles) of dissolved SIDA·H$_2$O was added dropwise with stirring 470 g of aqueous THP hemiacetal solution (prepared according to the method of Ser. No. 54,577, filed July 13, 1970, by the pressure reaction of phosphine and formaldehyde) containing 150.25 g (1.21 moles) of dissolved THP. After a 76 minute reaction period, solution pH had dropped to about 11. Solid product (790.2 g) was recovered by stripping the reaction solution to dryness under vacuum at 55°–60°C. Infrared and nuclear magnetic resonance spectroscopic data, along with elemental analyses and chemical test data confirmed the presence of STDAMP.

EXAMPLE V

TDAMP was prepared by treating an aqueous solution of STDAMP with 6 equivalents of HCl and recovering the resulting protonated product by the same technique as described in Example III. The formation of TDAMP was supported by infrared and nuclear magnetic resonance spectroscopic data, along with chemical test data.

EXAMPLE VI

STAMP was prepared by the reaction of THPC with sodium glycinate (SGY):

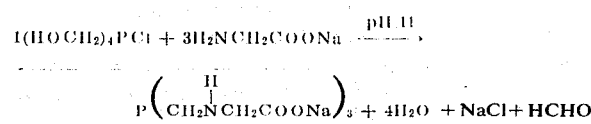

The reaction was carried out in a manner analogous to that described between THPC and SIDA in the formation of STDAMP: to 172 g of aqueous solution of pH 11 containing 34.45 g (0.459 moles) of dissolved glycine was added dropwise with stirring 61 g of aqueous solution containing 29.92 g (0.157 moles) of dissolved THPC. During THPC addition, the pH of this reaction solution was maintained at 11 by addition of 6M NaOH. A temperature elevation of 14° C (25°–39° C) was observed during the course of THPC addition, indicating a somewhat exothermic reaction to be occurring. At the end of THPC addition, a yellow-orange solution was present; this solution was stirred for an additional 45 minutes to ensure complete reaction. Solid product was recovered from the reaction solution by the addition of acetone to form a two layer system (an upper organic layer and a lower aqueous, oil layer). The layers were separated by decantation and additional acetone added to the lower layer (followed by successive decantation) until a solid granular white mass was present. This material was vacuum dried over P$_2$O$_5$ at 25° C to yield a free-flowing white powder. Yield: 60.7 g (100 percent of theoretical).

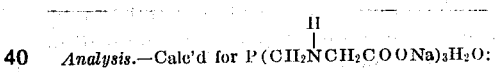

P, 8.18%; C, 28.50%; H, 4.52; Na, 18.20%

Found: P, 7.50%; C, 28.99% H, 4.42%; Na, 18.22%

The formation of STAMP was further supported by infrared and nuclear magnetic resonance spectroscopic data, along with chemical test data.

EXAMPLE VII

STDAMP reaction mixtures (I) and (II) were prepared by reacting THPC with SIDA in stoichiometric mole ratios of 1:2 and 1:1, respectively, according to the procedure outlined in Example III; in the preparation of reaction mixture (II), however, reagent addition was the reverse of that cited in Example III. The compositions of STDAMP reaction mixtures (I) and (II) were obtained by $^{31}$P and $^1$H nuclear magnetic resonance spectroscopic

EXAMPLE VIII

The Cu$^{+2}$ sequestering efficiencies of the new organophosphorus chelating agents are compared to measured efficiencies of several commercial sequestrants in Table I:

TABLE I

Cu⁺² Sequestering Efficiency (A Designation of 1.00 Represents a Value of 20.27 Lbs. of Cu$^{+2}$ Sequestered Per 100 Lbs. of Sequestrant)

| Sequestrant | pH 7 | pH 8 | pH 9 | pH 10 | pH 11 | pH 12 | pH 13 |
|---|---|---|---|---|---|---|---|
| STDAMP | 1.63 | 1.75 | 1.53 | 1.19 | 1.13 | 1.01 | 0.91 |
| MIXTURE (I) | | 1.62 | 1.56 | 1.42 | 1.10 | | |
| MIXTURE (II) | | 1.27 | 1.19 | 1.11 | 1.04 | | |
| TDAMP | | 2.11 | 1.72 | 1.52 | 1.43 | | |
| STAMP | | 1.26 | 1.63 | 1.81 | 1.97 | 1.85 | 1.40 |
| SEDTA | | 1.02 | 1.08 | 1.00 | 0.97 | | |
| SNTA | | 1.50 | 1.42 | 1.45 | 1.44 | | |
| SIDA | | 2.09 | 1.70 | 1.42 | 1.33 | | |
| SNTMP | | .074 | 0.84 | 0.76 | 0.79 | | |
| SDTPS | 1.31 | 1.70 | 1.58 | 1.07 | 0.79 | 0.70 | 0.39 |

EXAMPLE IX

The Fe$^{+3}$ sequestering efficiencies of the new organophosphorus chelating agents are compared to measured efficiencies of several commercial sequestrants in Table II.

TABLE II

Fe⁺³ Sequestering Efficiency (A Designation of 1.00 Represents a Value of 7.1 Lbs. of Fe$^{+3}$ Sequestered Per 100 Lbs. of Sequestrant)

| SEQUESTRANT | pH 7 | pH 8 | pH 9 | pH 10 | pH 11 | pH 12 |
|---|---|---|---|---|---|---|
| STDAMP | 1.89 | 1.69 | 1.58 | 1.58 | 0.83 | 0.39 |
| MIXTURE (I) | 3.19 | 2.60 | 2.32 | 2.28 | 1.38 | 0.87 |
| MIXTURE (II) | 5.00 | 5.24 | 4.88 | 4.53 | 3.15 | 2.96 |
| STAMP | 2.92 | 2.92 | 2.72 | 2.17 | 1.66 | 0.51 |
| SEDTA | 0.91 | 1.43 | 1.28 | 1.00 | 0.45 | 0.09 |
| SNTA | 1.08 | 0.99 | 0.82 | 0.68 | 0.29 | 0.09 |
| SIDA | 0.71 | 0.95 | 0.95 | 0.95 | 0.47 | 0.16 |
| THPO | | 0.08 | 0.36 | 3.61 | 10.10 | 19.70 |
| Gluconic Acid | 5.98 | 6.63 | 6.70 | 6.78 | 4.53 | 3.16 |
| SHEDTA | 2.20 | 2.55 | 2.55 | 2.36 | 1.50 | 0.76 |
| SNTMP | | | | 2.01 | 1.90 | 0.95 |
| SDTPA | 1.26 | 1.26 | 1.63 | 1.88 | 0.86 | 0.49 |

The scope of this invention includes all equivalents and modifications thereof which would be obvious to a person skilled in the field of this invention, and the invention is limited solely to the extent that limitations appear in the appended claims.

What is claimed is:

1. A method for sequestration of a metal ion selected from the group consisting of ions of the transition metals which comprises reacting with such ion in aqueous solution, a compound of the formula

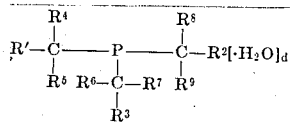

wherein $d$ is from 0 to 3;

R$^1$ and R$^2$ and R$^3$ are independently selected from the group consisting of hydroxy and an amino carboxylic group of the formula:

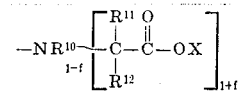

wherein $f$ is 0 or 1;

X is independently selected from the group consisting of hydrogen, ammonium and an alkali metal;

R$^4$–R$^9$ are independently selected from the group consisting of hydrogen, hydroxy and lower alkyl;

R$^{10}$–R$^{12}$ are independently selected from the group consisting of hydrogen and lower alkyl;

provided at least one of said R$^1$, R$^2$ or R$^3$ is said amino carboxylic group.

2. The method of claim 1 wherein the metal is selected from the group consisting of iron, copper, nickel, manganese and chromium.

3. The method of claim 1 wherein the metal ion is ferric ion.

4. The method of claim 1 wherein the metal ion is cupric ion.

5. The method of claim 1 wherein the metal ion is manganous ion.

6. The method of claim 1 wherein the solution is an aqueous solution.

7. The method of claim 1 where the solution contains hydrogen peroxide.

8. The method of claim 1 wherein R$^1$, R$^2$, and R$^3$ are each said aminocarboxylic group.

9. The method of claim 1 wherein X is selected from the group consisting of sodium and potassium.

10. The method of claim 1 wherein R$^1$ is hydroxyl.

11. The method of claim 1 wherein R$^2$ is hydroxyl.

12. The method of claim 1 wherein R$^4$–R$^{12}$ are each hydrogen.

13. The method of claim 1 wherein the sequestrant employed is hexasodium tris(N,N-diacetatoaminomethyl)phosphine.

14. The method of claim 1 wherein the sequestrant employed is trisodium tris(N-acetatoaminomethyl)phosphine.

15. The method of claim 1 wherein the sequestrant employed is tetrasodium mono(hydroxymethyl) bis(N,N-diacetatoaminomethyl)phosphine.

16. The method of claim 1 wherein the sequestrant employed is disodium bis(hydroxymethyl)N,N-diacetatoaminoethyl phosphine.

* * * * *